US006137075A

United States Patent [19]

Grabowski et al.

[11] Patent Number: 6,137,075
[45] Date of Patent: Oct. 24, 2000

[54] METHOD AND APPARATUS FOR PRODUCING AN ELECTRICAL BOND BETWEEN CONDUCTORS AND ELECTRICAL CONNECTOR CONTACTS

[75] Inventors: Thaddeus Grabowski, Pound Ridge; William J. Tkazyik, Hyde Park, both of N.Y.; Anthony Tolla, Darien; Gregory Sterc, Trumbull, both of Conn.

[73] Assignee: C&M Technologies Group, Inc., Wauregan, Conn.

[21] Appl. No.: 09/187,151

[22] Filed: Nov. 6, 1998

[51] Int. Cl.[7] .......................... B23K 11/00; B23K 11/10

[52] U.S. Cl. .......................... 219/56.22; 219/56.21; 219/91

[58] Field of Search .......................... 219/56.22, 56.21, 219/91

[56] References Cited

U.S. PATENT DOCUMENTS

| | | | |
|---|---|---|---|
| 3,775,579 | 11/1973 | Burghart et al. | 219/91 |
| 4,475,681 | 10/1984 | Ingle | 219/56.21 |
| 4,849,596 | 7/1989 | Riordan et al. | 219/56.22 |
| 5,045,641 | 9/1991 | Urushibata et al. | 219/56.22 |
| 5,097,100 | 3/1992 | Jackson | 219/56.22 |
| 5,138,127 | 8/1992 | Fries et al. | 219/56.21 |

*Primary Examiner*—Patrick Ryan
*Assistant Examiner*—Anjan Dey
*Attorney, Agent, or Firm*—Raymond Nuzzo

[57] ABSTRACT

A method and apparatus for producing an electrical bond between a conductor and an electrical connector contact. The apparatus generally comprises a power source and a weld head. The power source has a first polarity output and a second polarity output. The weld head has an input for connection to the first polarity output of the power source. The apparatus includes a first electrode electrically connected to the weld head input. The apparatus further includes a second electrode electrically connected to the second polarity output of the power source. The method comprises the steps of positioning the conductor and the connector contact so that the conductor and connector contact are in physical contact with one another and positioned over the second electrode, contacting the conductor and the connector contact with the first electrode with a predetermined compressive force so that the conductor and connector contact are pressed against each other and against the second electrode, and allowing a current of a predetermined magnitude to flow through the first electrode, the conductor and connector contact, and the second electrode.

10 Claims, 7 Drawing Sheets

METHOD AND APPARATUS FOR PRODUCING AN ELECTRICAL BOND BETWEEN CONDUCTORS AND ELECTRICAL CONNECTOR CONTACTS

BACKGROUND OF THE INVENTION

1. Field of the Invention

The present invention generally relates to electrical connectors.

2. Problem to be Solved

Electrical connectors are used in industry for a variety of purposes. There are many sizes and types of connectors. Each type of connector is configured for a specific purpose, e.g. instrumentation, communications, computer connections, etc. One widely used electrical connector is referred to as a SCSI (Small Computer System Interface). Another widely used connector is an LFH™-type conductor. There are many other types and brands of electrical connectors that are used in industry today. Such connectors have a plurality of contacts or pins attached to a non-conductive body. Conductors are embedded within the non-conductive body and electrically connect each contact with a corresponding male or female contact located within an exterior frame. Typically, the frame is fabricated from metal or plastic. The frame is configured for attachment to a complementary frame of a mating connector that is attached to cable or device. The mating connector has a plurality of complementary contacts wherein each complementary contact corresponds to a male or female contact of the first connector. The cable to which the aforementioned connectors are attached contain a plurality of conductors or wires that are electrically connected or coupled to the contacts of the connectors.

One conventional method used in an attempt to achieve a proper electrical connection between the conductors and the contacts involves manually applying solder to the contact and conductor. However, solder connections produced in this manner are not always reliable. Specifically, "cold joints" sometimes result after the application of solder. Thus, although upon visually inspection it may appear that there is an electrical connection, in reality there is not. Another problem resulting from manually applying solder is the inadvertent contact between solder and adjacent contacts thereby creating short circuits.

Other problems associated with the manual application of solder result from the introduction of flux. Flux is a material used to promote the joining of metals in soldering. Most types of flux contain corrosive substances such as zinc-chloride. Such substances can result in the corrosion of the conductors and connector contacts that have been joined with solder. Furthermore, the flux may contain contaminants that may alter the resistance or impedance seen by signals being inputted into the other end of the cable to which the electrical connector is attached.

It is therefore an object of the present invention to provide a new method and apparatus for producing electrical connections between electrical connector contacts and conductors.

It is another object of the present invention to provide a new method and apparatus for producing electrical connections between electrical connector contacts and conductors that overcomes the foregoing problems associated with conventional methods.

It is another object of the present invention to provide a new method and apparatus for producing electrical connections between electrical connector contacts and conductors that can be implemented at reasonable costs.

Other objects and advantages of the present invention will be apparent to one of ordinary skill in the art in light of the ensuing description of the present invention.

SUMMARY OF THE INVENTION

The present invention is directed to, in one aspect, a method and apparatus for producing an electrical bond between a conductor and an electrical connector contact. The apparatus generally comprises a power source and a weld head. The power source has a first polarity output and a second polarity output. The weld head has an input for connection to the first polarity output of the power source. The apparatus includes a first electrode electrically connected to the weld head input. The apparatus further includes a second electrode electrically connected to the second polarity output of the power source. The method comprises the steps of positioning the conductor and the connector contact so that the conductor and connector contact are in physical contact with one another and positioned over the second electrode, contacting the conductor and the connector contact with the first electrode with a predetermined compressive force so that the conductor and connector contact are pressed against each other and against the second electrode, and allowing a current of a predetermined magnitude to flow through the first electrode, the conductor and connector contact, and the second electrode.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiments of the present invention, reference will be made herein to FIGS. 1–17 of the drawings in which like numerals refer to like features of the invention.

It is to be understood that the first and second embodiments of the apparatus and method of the present invention can be used in the manufacture of electrical connectors as well as repairing or retrofitting existing connectors. It is also to be understood that although specific commercially available connectors are mentioned in the ensuing description, the both embodiments of the method and apparatus of the present invention may be used with other types or brands of electrical connectors that are used in industry, e.g. RS-232, RS 422, VHDIC, etc.

FIRST EMBODIMENT

In order to facilitate understanding the first embodiment of the method and apparatus of the present invention, the ensuing description is divided into three (3) parts: (1) try Connector, (2) Apparatus, and Method. The first part describes the type of connector with which the first embodiment of the method and apparatus of the present invention can be used. The second section describes the first embodiment of the apparatus of the present invention that is used for carrying out the steps of the first embodiment of the method of the present invention. Specifically, this section describes the pertinent parts of the apparatus and preferred types of instrumentation. This section also describes preferred settings or configurations of such instrumentation. The third part describes each and every step of the method of the present invention and the utilization of the aforementioned apparatus in order to achieve efficient and proper implementation of the aforementioned method. It is to be understood that the specific instrumentation referred to below constitutes one manner of implementing the particular steps of the method of the present invention and that other suitable types of instruments or devices can be used to implement the method of the present invention.

1) Connector

Figure 1:
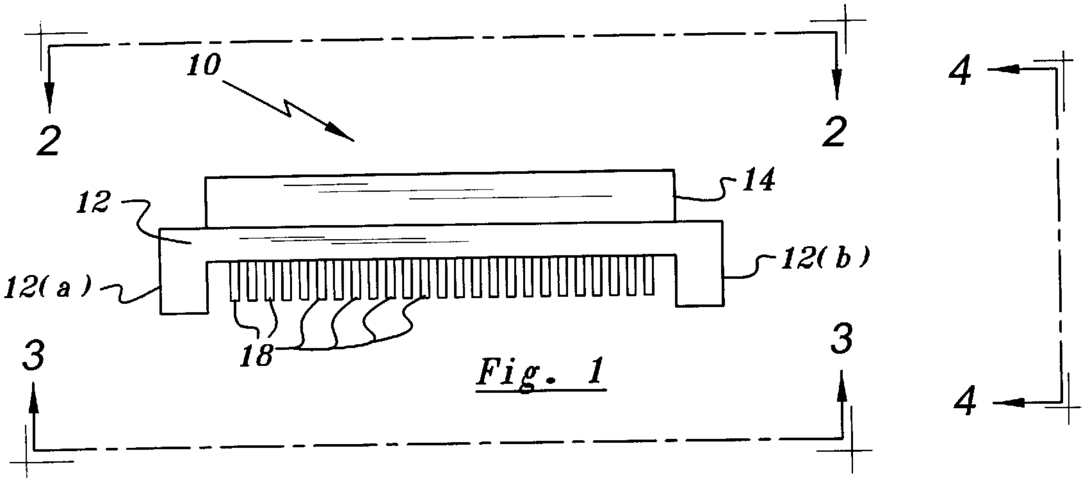
FIG. 1 is a side elevational view of one type of electrical connector with which a first embodiment of the apparatus and method of the present invention can be used.
Figure 2:
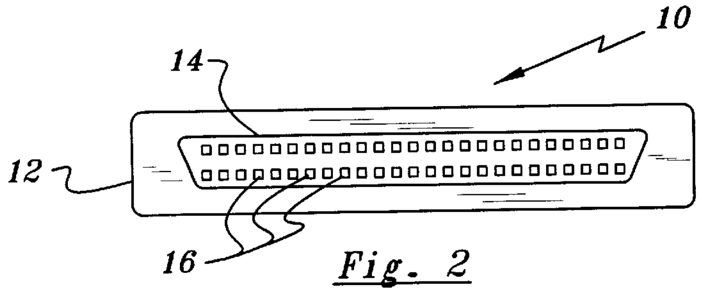
FIG. 2 is a top plan view taken along line 2—2 in FIG. 1.
Figure 3:
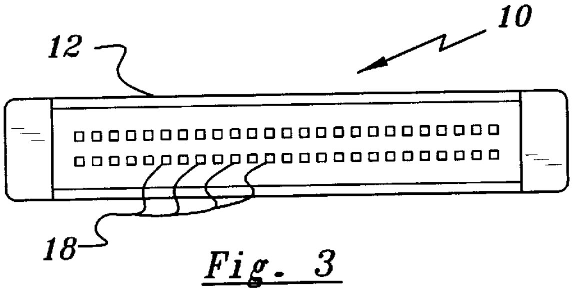
FIG. 3 is a bottom plan view taken along line 3—3 of FIG. 1.

Referring to FIGS. 1–4, there is shown one type of electrical connector 10 with which the method and apparatus of the present invention can be used. This type of connector is known in the art as a “SCSI”-type connector that was discussed above. Connector 10 generally comprises electrically non-conductive body 12 and frame 14 that is attached to body 12. Body 12 has ends **12*a* and 12*b*. Frame 14 is typically fabricated from metal or plastic. Connector 10 includes a plurality of contacts 16 extending from body 12 and 5 located within frame 14. As shown in FIG. 2, there are two (2) parallel rows of contacts 16. Connector 10 further includes a plurality of contacts 18 that extend from body 12 in a direction opposite that of contacts 16. As shown in FIG. 3, there are two (2) parallel rows of contacts 18. Each contact 18 is electrically coupled to a corresponding one of contacts 16**.

Figure 4:
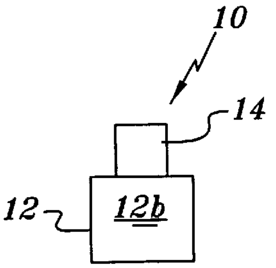
FIG. 4 is an end view taken along line 4—4 of FIG. 1.
Figure 4B:
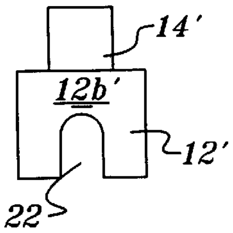
FIG. 4B is a view, similar to FIG. 4, of the connector of FIG. 4A.
Figure 4A:
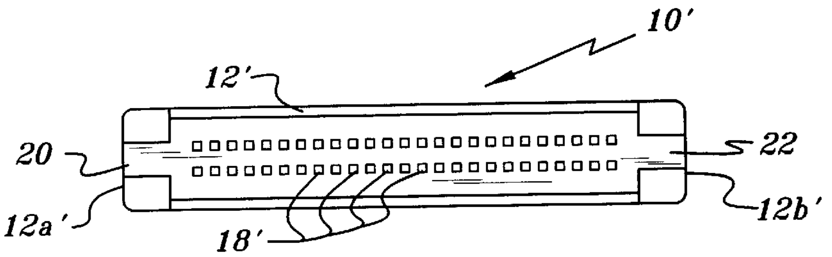
FIG. 4A is a view, similar to FIG. 3, illustrating modifications made to the connector of FIG. 1 in accordance with the method of the present invention.

In accordance with the method of the present invention, connector 10 is modified to have the configuration of connector 10' shown in FIGS. 4A and 4B. Connector 10' comprises body 12' and frame 14'. Body 12' includes ends **12*a*' and 12*b*'. Connector 10' includes contacts (not shown) within frame 14' that are identical to contacts 16 in FIG. 2. Connector 10' further includes contacts 18' that are generally the same as contacts 18 of connector 10. Connector 10' is generally the same in construction as connector 10 except that body ends 12*a*' and 12*b*' have slots 20 and 22, respectively. The purpose of slots 20 and 22** is discussed in detail below.

As will be shown by the ensuing description, the method and apparatus of the present invention effects an electrical bond between cable conductors and connector contacts that is superior to that achieved with the aforementioned conventional methods.

1) Apparatus

Figure 5:
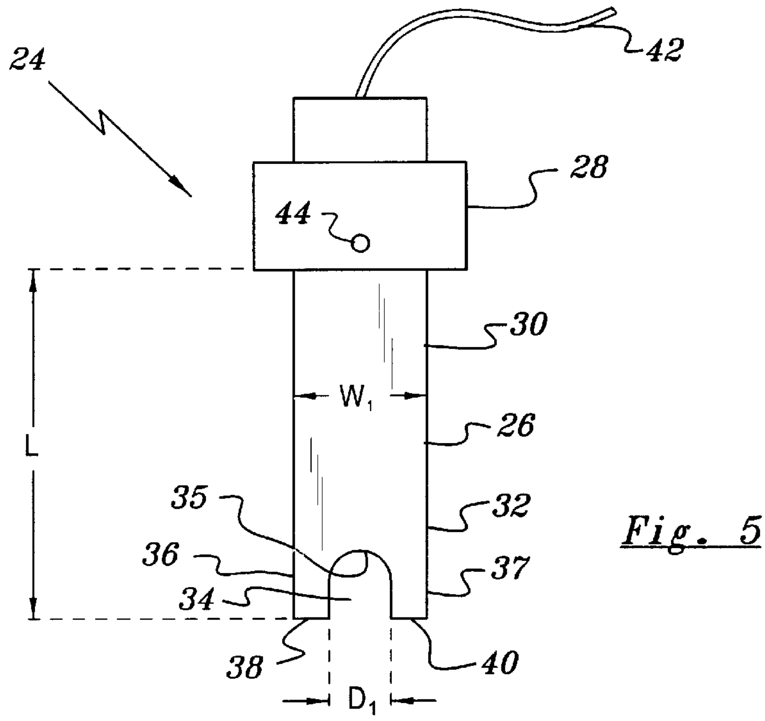
FIG. 5 is a side elevational view of an electrode that is utilized in the apparatus of the present invention.

The apparatus of the present invention that is used to implement the steps of the first embodiment of the method of the present invention comprises several components. Referring to FIG. 5, the apparatus comprises electrical current application device 24 for applying an electrical current to the conductor and a corresponding connector contact so as to produce an electrical bond between the conductor and contact. Device 24 comprises electrode 26 and weld head 28. Electrode 26 has a predetermined length L. The actual length L of electrode 26 depends upon the type and size of the connector contacts (such as contacts 18) and the corresponding conductor. In one embodiment, the length L is between about 40 mm (millimeters) and 60 mm, inclusive.

Figure 15:
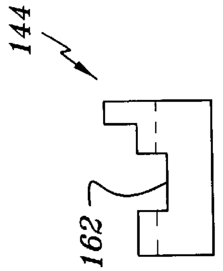
FIG. 15 is an end view taken along line 15—15 of FIG. 14.
Figure 16:
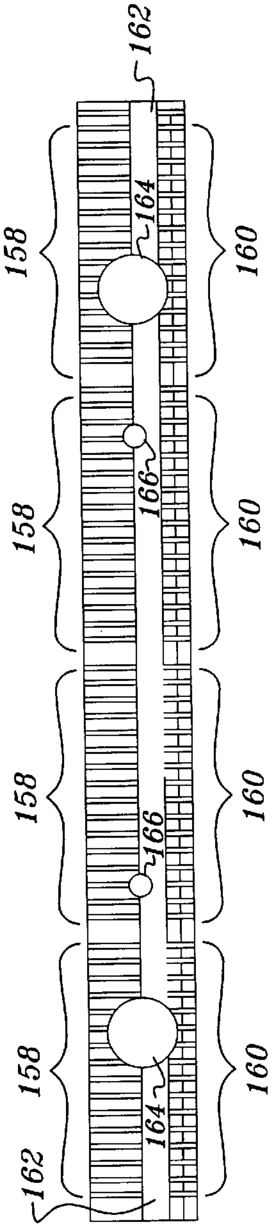
FIG. 16 is a top plan view taken along line 16—16 of FIG. 14.

As shown in FIG. 15, electrode 26 has an upper portion 30 and a lower portion 32. Upper and lower portions 30 and 32, respectively, have a width W1. Width W1 of electrode 26 may vary depending upon the size (AWG) and type of the cable conductor and connector contact to which electrode 26 is applied. Lower portion 32 defines channel or gap 34 that extends through the thickness of electrode lower portion 32. Channel 34 has inner wall 35. Channel 34 is intermediate portions 36 and 37 of lower electrode portion 32. A distance D1 separates portions 36 and 37 and also defines the width of channel 34. Portion 36 has a distal end 38. Similarly, portion 37 has a distal end 40. In one embodiment, channel 34 is substantially “U” shaped. As viewed in FIG. 15, the “U” shaped space is upside down. However, it is to be understood that channel 34 may have other suitable shapes, e.g. substantially V-shaped, triangular, square, semi-circular, rectangular, etc. The actual shape of channel 34 depends upon the gauge (AWG) of contact 18 and the conductor that are to be electrically bonded together.

Referring to FIG. 5, the distance D1 is such as to allow channel 34 to receive a cable conductor and a connector contact. Specifically, channel 34 functions to receive, “gather” and align a contact 18' and the corresponding conductor. This will be discussed below in detail.

In a preferred embodiment, electrode 26 is fabricated from a material that has strength, durability and the ability to withstand current pulses of various magnitudes therethrough, but yet sufficiently small in size and light in weight to be used on the small-sized connector contacts and wire-gauges currently used in industry. In one embodiment, the electrode 26 is fabricated from Elkanight. However, electrode 26 can be fabricated from other suitable materials.

Referring to FIG. 5, weld head 28 firmly retains electrode 26 and transfers a current from a power source (not shown) to electrode 26. Weld head 28 includes positive polarity lead 42 connected to a positive polarity output voltage terminal of the power source (not shown). Weld head 28 further includes set screw 44 for fastening electrode 26 to weld head 28. In a preferred embodiment, weld head 28 is a Model VTA 66 Weld Head manufactured by Palomar Technologies of Vista, Calif. However, other suitable weld heads can also be used.

Figure 6:
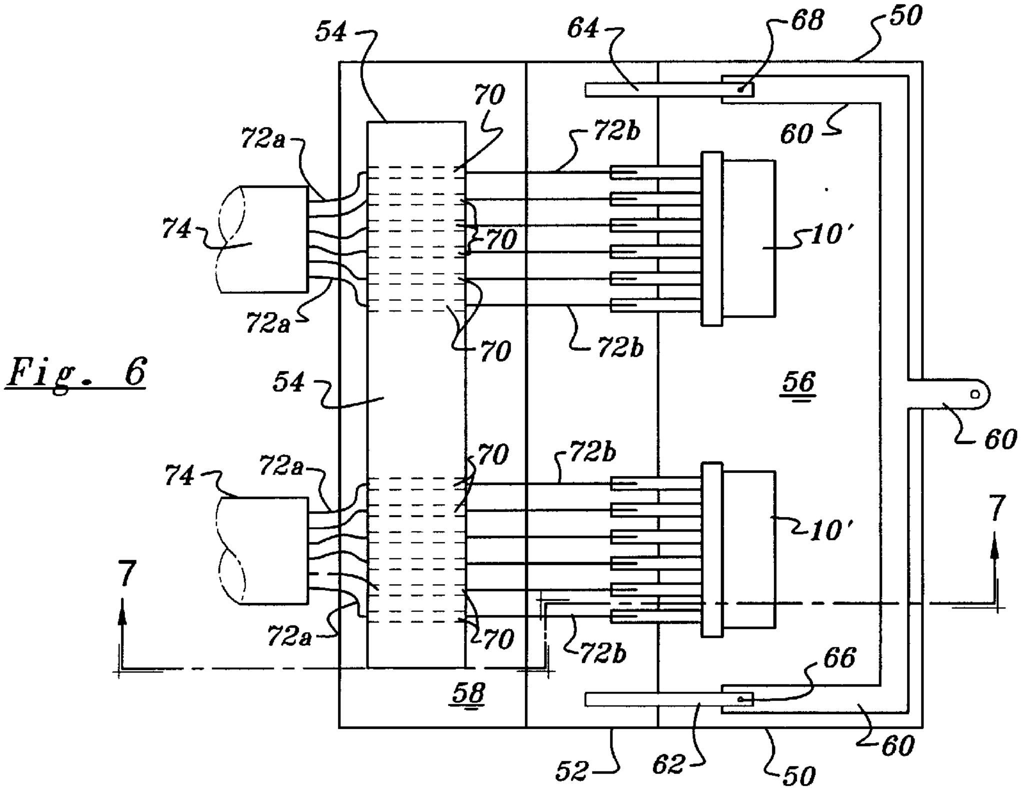
FIG. 6 is a top plan view of a device for aligning cable conductors and connector contacts, the device being a part of the apparatus of the present invention.
Figure 7:
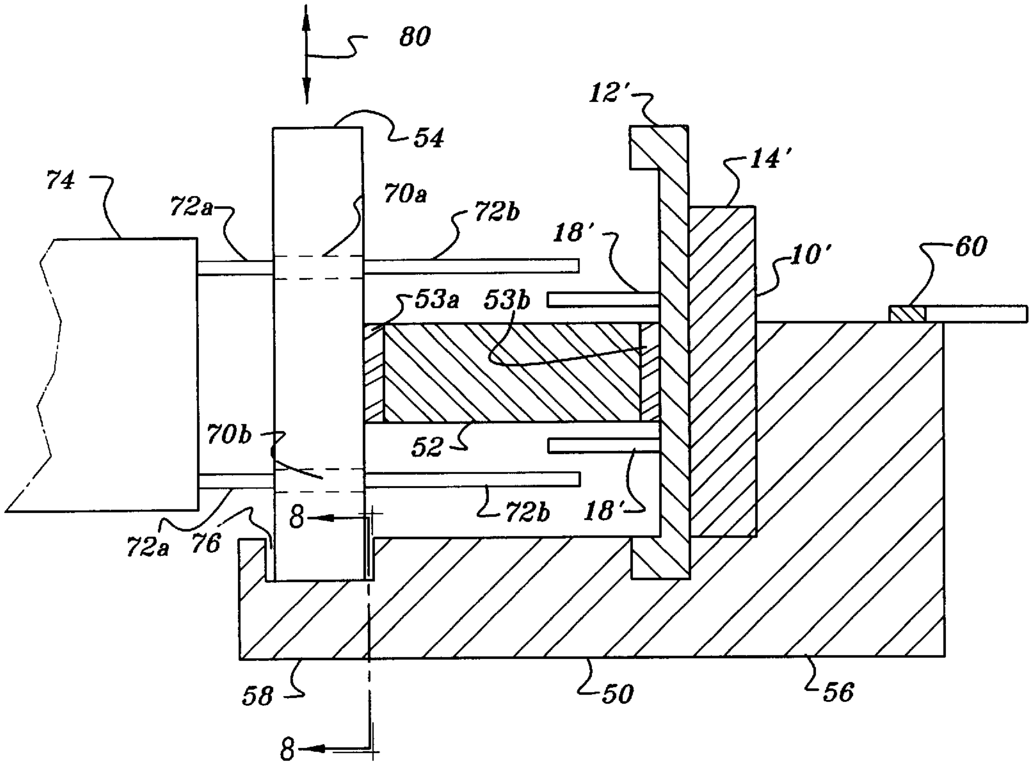
FIG. 7 is a cross-sectional view taken along line 7—7 in FIG. 6.

Referring to FIGS. 6 and 7, the apparatus of the present invention further includes nest or fixture 50, negative electrode 52, and pre-line fixture 54. Electrode 52 is positioned between connector 10' and pre-line fixture 54. Insulator 53*a* is positioned between pre-line fixture 54 and electrode 52. Similarly, insulator 53*b* is positioned between connector 10' and electrode 52. Insulators 53*a* and 53*b* prevent electrical connectivity between electrode 52 and pre-line fixture 54, and between electrode 52 and body 12' of connector 10'. In one embodiment, insulators 53*a* and 53*b* comprise air gaps. However, insulators 53*a* and 53*b* may also be fabricated from any electrically non-conductive material. Nest 50 comprises portion 56 for supporting connectors 10' and portion 58 supporting pre-line fixture 54. Although only two connectors 10' are shown, it is to be understood that nest 50 can be configured to support fewer than or more than two connectors 10'.

Referring to FIGS. 6 and 7, nest 50 is fabricated from electrically non-conductive except for negative polarity conductor 60 that is attached to nest 50. Connector 10' is firmly retained by nest 50 in order to prevent movement thereof during the process of producing an electrical bond between contact 18' and a corresponding conductor. Conductor 60 is electrically connected to the negative polarity terminal of the power supply described above. Conductors 62 and 64 are pivotally attached to conductor 60 via fasteners 66 and 68, respectively, and when pivoted as shown, electrically connect negative electrode 52 to negative polarity conductor 60. Electrode 52 is positioned in such a manner that when conductors 62 and 64 are positioned as shown in FIG. 6, conductors 62 and 64 frictionally contact electrode 52 so as to insure reliable electrical connectivity.

Referring to FIG. 6, cables 74 have insulation covered wires 72*a*. Wires 72*a* are stripped of the insulation to expose inner conductors 72*b*. Pre-line fixture 54 has a plurality of openings or bores 70*a* and 70*b* extending therethrough that are sized for receiving conductors 72*b*. Openings 70*a* are positioned in the top portion of fixture 54 and openings 70*b* are positioned in the lower portion of fixture 54.

In a preferred embodiment, the first embodiment of the apparatus of the present invention includes a power supply (not shown) that has operational characteristics of a Model HCD 125 Power Supply or a Model MCW 550 Power Supply with Auxiliary Battery Back-up Model ABP-15, both of which being manufactured by Palomar Technologies of Vista, Calif. However, other power supplies having generally the same operational characteristics of those power supplies mentioned above can also be used. The actual magnitude of the output voltage depends upon the gauge (AWG) of the conductors 72*b* and contacts 18'. In a preferred embodiment, a stand (not shown) is used to support the power supply and weld head 28.

The apparatus of the present invention further includes an air cylinder (not shown). The air cylinder is used to bi-directionally move weld head 28 toward and away from the connector contacts 18' and conductors 72*b*. In one embodiment, the air cylinder moves weld head 28 in a vertical orientation. The air cylinder preferably includes an air regulator that is set at a predetermined air pressure in order to move weld head 28 a predetermined distance that effects a firm physical and electrical contact between inner wall 35 of channel 34 and a conductor 72*b* and contact 18'. In one embodiment, the predetermined air pressure is between about 40 and 60 p.s.i. (pounds/square inch). Referring to FIGS. 5–7, set screw 44 and an adjustment knob (not shown) located on weld head 28 are set to predetermined orientations so that when the air cylinder (not shown) moves weld head 28 downward to a maximum distance, inner wall 35 of channel 34 (of electrode lower portion 32) firmly contacts a conductor 72*b* and a corresponding contact 18'. In a preferred embodiment, weld head 28 includes control knob (not shown) for configuring the air cylinder so that electrode 26 exerts a predetermined compressive force upon a conductor 72*b* and contact 18' when weld head 28 moves the maximum distance toward nest 50. Preferably, the air cylinder is configured so that weld head 28 flexes when it contacts a conductor 72*b* and contact 18' in order to effect firm physical and electrical contact between inner wall 35 of channel 34 and the conductor 72*b* and contact 18'. In a preferred embodiment, the air cylinder is adjusted so that weld head 28 exerts a force between about 4 and 5 pounds, inclusive, upon conductor 72*b* and contact 18'.

Weld head 28 further includes a micro-switch (not shown) that is activated when electrode 26 contacts the conductor 72*b* and contact 18' with the aforementioned predetermined force. When the micro-switch is activated, electrical current will flow from the power supply to electrode 26. This will be explained below in detail.

Since the typical electrical connector (such as connector 10') has a plurality of contacts 18' and cable 74 has a plurality of conductors 72*b*, electrode 26 is applied to each and every pair of conductors 72*b* and contacts 18' (referred to herein as "conductor/contact pair"). Thus, in a preferred embodiment, nest 50 is moved so that electrode 26 contacts each conductor/contact pair in a successive manner. Channel 34 of electrode 26 functions to "gather" each conductor pair thereby ensuing proper alignment of the conductor 72*b* and contact 18' before the current is allowed to flow to electrode 26. In one embodiment, a step motor (not shown) is used to effect uniform movement of nest 50 such that electrode 26 can contact all conductor/contact pairs. In a preferred embodiment, nest 50 is mounted to a table or tray and the step motor is configured to move the table or tray in predetermined increments. The predetermined increments depend upon the distance separating the contacts 18' on electrical connector 10'. In a preferred embodiment, the step motor is controlled by a programming or control box. The programming or control box is configured to control the step motor such that the step motor moves the table or tray in the aforementioned predetermined increments. In a preferred embodiment, the table has the operational characteristics of the Model NEAT LM600 single axis table manufactured by New England Affiliated Technologies of Lawrence, Mass. In a preferred embodiment, the programming or control box has the operational characteristics of the Model NEAT LM310 controller manufactured by New England Affiliated Technologies.

Figure 8:
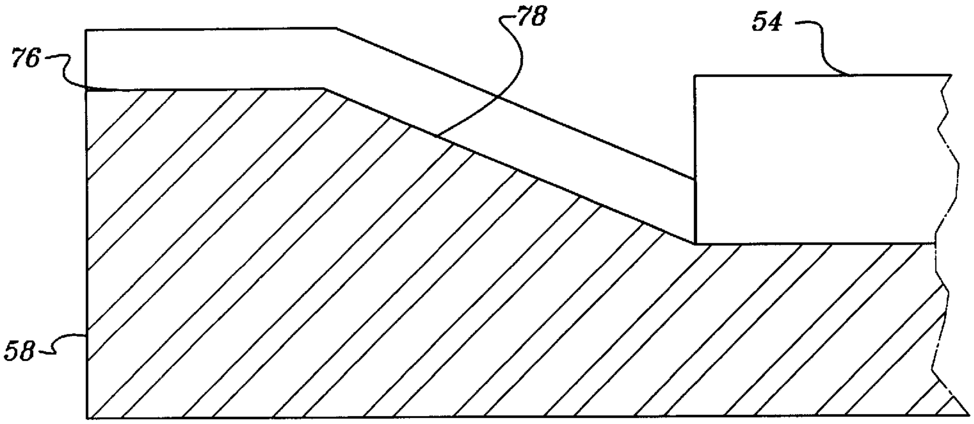
FIG. 8 is a cross-sectional view taken along 8—8 in FIG. 7.

Referring to FIG. 6 and 7, preline fixture 54 is slidably disposed within channel 76 that is formed in portion 58 of nest 50. As shown in FIG. 8, channel 76 includes inclined surface 78. Movement of pre-lined fixture 54 along inclined surface 78 effects vertical movement of pre-line fixture 54 as indicated by arrow 80 in FIG. 7. Pre-line fixture 54 is moved until conductors 72*b* are aligned with contacts 18' (see FIG. 6).

2) Description of the Method of the Present Invention a) The first step of the method of the present invention is providing electrical connector 10' with at least one (1) contact 18'.

b) Body 12 of connector 10 is configured to have slots in the ends of the body 12. This is illustrated in FIGS. 4 and 4A wherein re-configured connector 10' has slots 20 and 22 formed in sides 12*a*' and 12*b*', respectively.

c) Connector 10' is then secured to nest 50 so that all contacts 18' are exposed as shown in FIG. 6.

d) The next step entails removing the insulation from insulation covered wires 72*a* to expose conductors 72*b*.

e) Next, the conductors 72*b* are disposed through openings 70 of pre-line fixture 54 and slid over contacts 18' of connector 10'. If nest 50 utilizes channel 76, then pre-line fixture 54 can be moved along inclined surface 76 until conductors 72*b* are positioned over contacts 18'.

f) The next step entails programming the programming box to control the air cylinder so as to depress weld head 28 at predetermined time increments to effect contact with the conductor/contact pair with the predetermined amount of compressive force. The predetermined time increments depend upon the distance separating the contact elements 18' on electrical connector 10'.

g) Next, the step motor is configured to move nest 50 at a rate that corresponds to the predetermined time increment at which at which weld head 28 is depressed by the air cylinder.

h) The next step entails commencing movement of nest 50 so that each contact 18' will confront (or pass directly underneath) electrode 26. In order to accomplish this, the step motor (not shown) is activated.

i) When weld head 28 descends its maximum distance, channel 34 of electrode 26 gathers and receives conductor 72*b* and contact 18', and inner wall 35 firmly contacts conductor 72*b* and contact 18' with the predetermined amount of compressive force. During such contact, the micro-switch is activated and a current from the power supply is allowed to pass through positive lead 42, electrode 26, conductor 72*b*, contact 18', negative electrode 52 and negative conductor 60 (see FIG. 6). The flow of current, as described above, creates an electrical bond between the conductor 72*b* and contact 18'. As used herein, the term "electrical bond" refers to a permanent, physical joint between contact 18' and conductor 72*b* such as a thermo-compression bond or a true weld. Whether a thermo-compression bond or a true weld is produced depends upon several factors, including: (i) the types of metals from which the conductors and contacts are fabricated, (ii) the magnitude of current flowing through conductor 72*b* and contact 18', and (iii) the magnitude of compressive force at which electrode 26 contacts conductor 72*b* and 18'. Thus, the aforementioned factors must be considered when determining whether a thermo-compression bond or a true weld is required.

j) After the electrical bond is created between contact 18' and corresponding conductor 72*b*, weld head 28 is retracted or moved away from the nest 50. The step motor then moves nest 50 so that the next conductor/contact pair is positioned directly under electrode 26. Once nest 50 is positioned to the desired location, weld head 24 is then depressed (or moved toward) the next conductor/contact pair so as to effect contact between inner wall 35 of electrode channel 34 and the conductor/contact pair with the predetermined amount of compressive force. Thus, steps (f)–(j) are repeated until an electrical bond is created between every contact 18' and corresponding conductor 72*b*.

k) The next step is to remove connector 10' from nest 50, flip it over, re-secure it to nest 50 and repeat steps (f)–(j) on the other row of contacts 18'.

l) Once all the conductors 72*b* are electrically bonded to contacts 18', connector 10' is removed from nest 50.

m) Next, a substantially rigid electrically insulating member (not shown) is inserted or slid through slots 20 and 22 such that the insulating member is between the rows of contacts 18'. The insulating member can be fabricated from electrically non-conductive materials, e.g. plastic, plexi-glass, P.V.C., etc. The rigid insulating member effects strain relief thereby preventing (i) deformation of contacts 18' during handling of connector 10' and cable 74 and (ii) shorts between the rows of contacts 18'.

n) The next step entails applying an epoxy over the insulating member in order to seal the insulating member in place.

SECOND EMBODIMENT

In order to facilitate understanding the second embodiment of the method and apparatus of the present invention, the ensuing description is divided into three (3) parts: (1) Connector, (2) Apparatus, and (2) Method. The first part describes the type of connector with which the second embodiment of the method and apparatus of the present invention can be used. The second section describes the second embodiment of the apparatus of the present invention that is used for implementation of the second embodiment of the method of the present invention. Specifically, this section describes the pertinent parts of the apparatus and preferred types of instrumentation. This section also describes preferred settings or configurations of such instrumentation. The third part describes each and every step of the second embodiment of the method of the present invention and the utilization of the aforementioned apparatus in order to achieve efficient and proper implementation of the aforementioned method. It is to be understood that the specific instrumentation referred to below, which is utilized by the second embodiment of the apparatus of the present invention, constitutes one manner of implementing the particular steps of the second embodiment of the method of the present invention and that other suitable types of instruments or devices can be used as well.

It is to be understood that the method of the present invention can be used in the manufacture of electrical connectors as well as repairing or retrofitting existing connectors.

1) Connector

Figure 9:
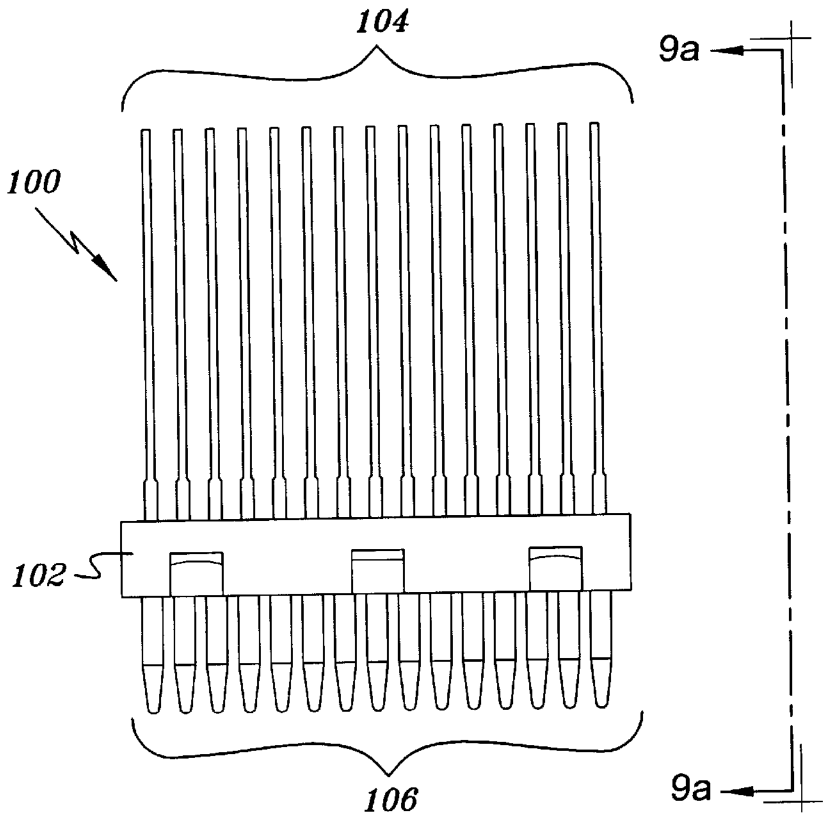
FIG. 9 is a top plan view of another type of connector with which an alternate embodiment of the method and apparatus of the present invention can be used.
Figure 9A:
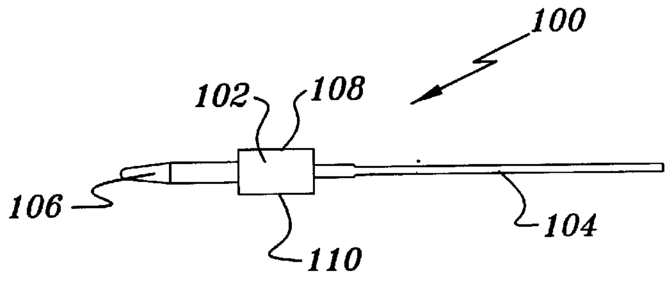

Referring to FIG. 9, there is shown another type of electrical connector 100 with which the method of the present invention can be used. This type of electrical connector is referred to as LFH™-type connector. Connector 100 generally comprises electrically non-conductive member 102, contacts 104 and contacts 106. Contacts 104 and 106 are attached member 102. Member 102 has top surface 108 and bottom surface 110. Member 102 is typically fabricated from plastic. Each contact 104 is electrically coupled to a corresponding one of contacts 106.

1) Apparatus

Figure 10:
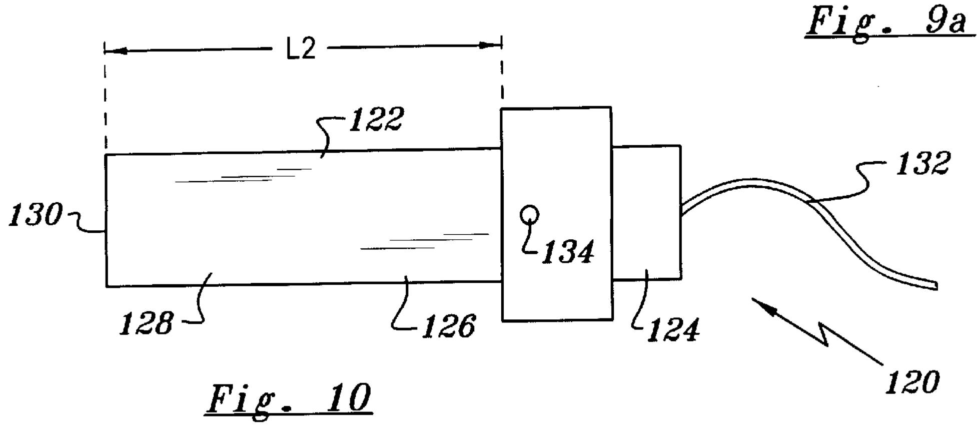
FIG. 10 is an elevational view of an electrode that is part of the alternate embodiment of the apparatus of the present invention.

The second embodiment of the apparatus of the present invention that is used to implement the second embodiment of the method of the present invention comprises several components. Some of these components are the same as those used by the first embodiment of the apparatus of the present invention. Specifically, the commercially available weld head, power supply, air cylinder, table and programming box discussed above are also utilized by the second embodiment of the apparatus of the present invention. Referring to FIG. 10, the apparatus comprises electrical current application device 120 for applying an electrical current to a contact 106 and a corresponding conductor so as to produce an electrical bond between the conductor and contact. Device 120 comprises electrode 122 and weld head 124. Electrode 122 has a predetermined length L2. In one embodiment, the length L2 is between about 40 mm (millimeters) and 60 mm, inclusive.

As shown in FIG. 2, electrode 122 has upper portion 126 and lower portion 128. Electrode 122 extends to distal end 130. End 130 is substantially flat. Electrode 122 has a width W1. Width W1 may vary depending upon the size (AWG) and type (e.g. solid, strand, etc.) of the conductor and connector contact to which electrode 122 is applied. In a preferred embodiment, electrode 122 is fabricated from the same materials that are used to fabricate electrode 26 (discussed above).

Referring to FIG. 10, weld head 124 firmly retains electrode 122 and transfers a current from a power source or supply (not shown) to electrode 122. Weld head 124 includes positive polarity lead 132 connected to a positive polarity output voltage terminal of the power source. Weld head 124 further includes set screw 134 for fastening electrode 122 to weld head 124. In a preferred embodiment, weld head 124 is a Model VTA 66 Weld Head manufactured by Palomar Technologies of Vista, Calif., which is discussed above.

Figure 11:
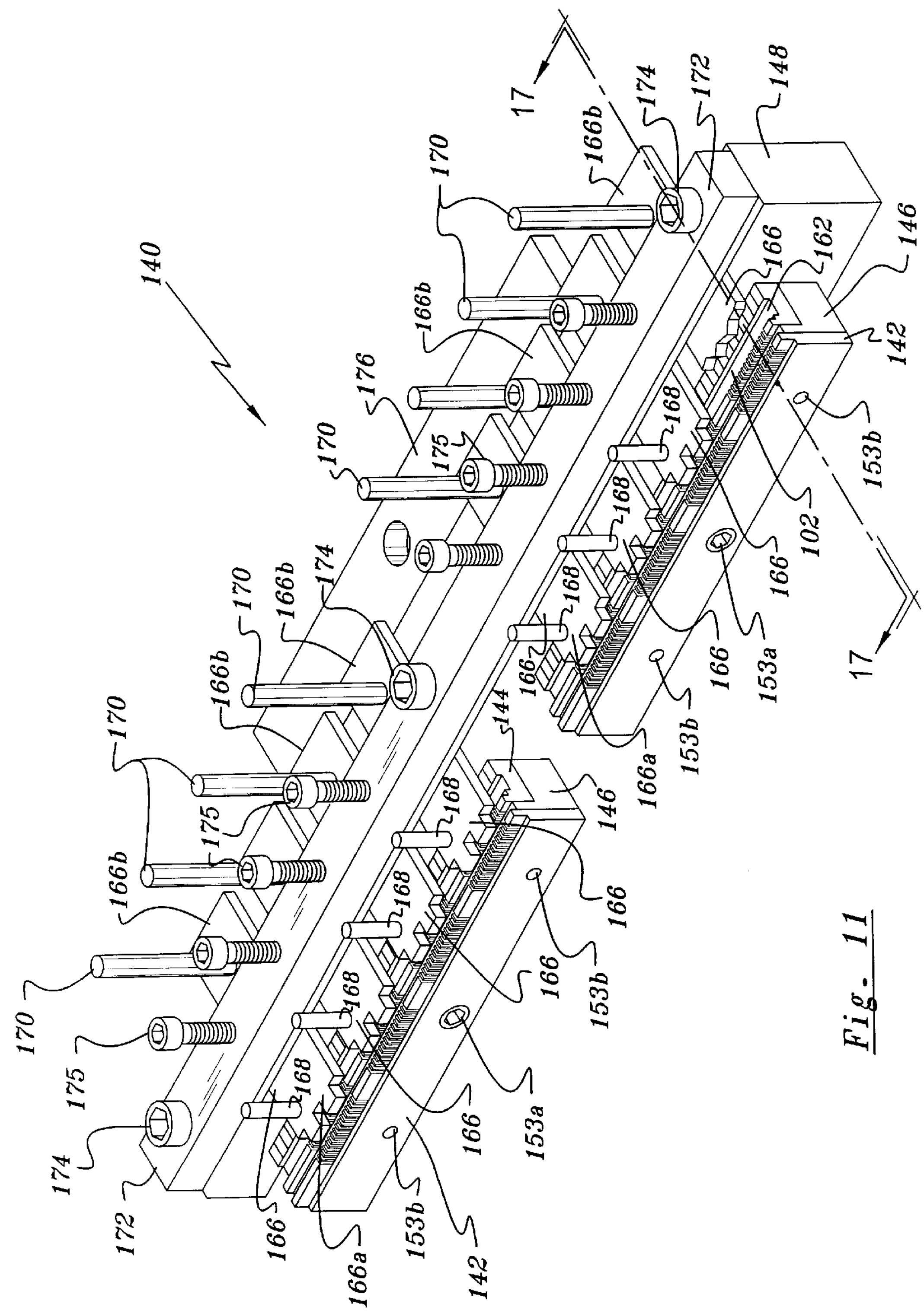
FIG. 11 is a perspective view of a bottom electrode assembly which is part of the alternate embodiment of the apparatus of the present invention.
Figure 13:
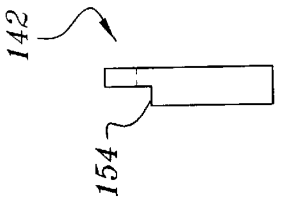
FIG. 13 is an end view taken along line 13—13 of FIG. 12.
Figure 12:
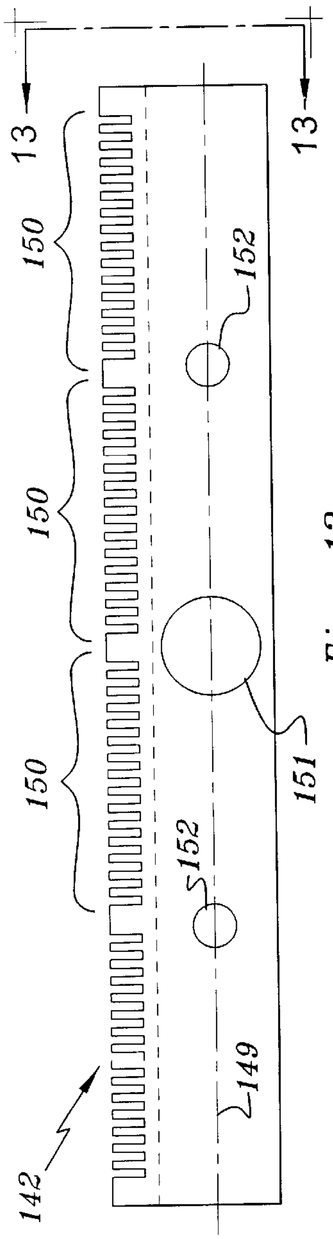
FIG. 12 is a front elevational view of a side comb shown in FIG. 11.
Figure 14:
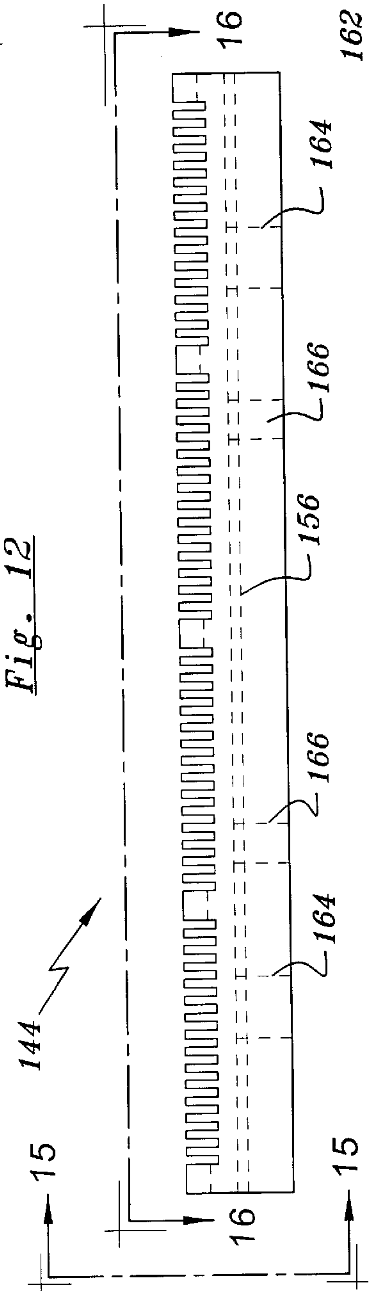
FIG. 14 is a front elevational view of a top comb shown in FIG. 11.

Referring to FIG. 11, the second embodiment of the apparatus of the present invention further comprises bottom electrode assembly 140. Bottom electrode assembly 140 generally comprises side comb 142, top comb 144, negative electrode 146 and support member 148. One of the functions of bottom electrode assembly 140 is to function as a nest or fixture to which the conductor and connectors are secured. Referring to FIGS. 12 and 13, side comb 142 has a longitudinally extending axis 149. Side comb 142 includes a plurality of sets or groups of channels 150. Channels 150 extend generally perpendicular to axis 149. Each channel 150 is sized for receiving a corresponding contact 106 of contact 100. Side comb 142 comprises openings 151 and 152 that are sized for receiving screws 153*a*, 153*b* or other fasteners that attach side comb 142 to negative electrode 146 and support member 148. Side comb 142 further includes longitudinally extending lip or edge 154. The purpose of lip or edge 154 is to receive the insulation of cable 74.

Referring to FIGS. 11 and 14–16, top comb 144 has longitudinally extending axis 156. Top comb 144 includes a plurality of groups or sets of channels 158. Each channel 158 extends generally perpendicular to axis 156. Each channel 158 is sized for receiving a contact 104 of connector 100. Top comb 144 further comprises a plurality of groups or sets of channels 160. Each channel 160 is sized for receiving a contact 106 of connector 100 and is substantially aligned with a corresponding channel 158. Top comb 144 further includes longitudinally extending channel 162 that is located between channels 158 and 160. Channel 160 is sized for receiving member 102 of connector 100. Thus, top comb 144 functions as a nest for securing the connector 100. Top comp 144 further includes openings 164 and 166 that are sized for receiving screws or other fasteners that attach top comb 144 to negative electrode 146. When side comb 142 is attached to negative electrode 146 and support member 148, and top comb 144 is attached to negative electrode 146, each channel 150 of side comb 142 is substantially aligned with a corresponding channel 160 of top comb 144.

Referring to FIG. 11, bottom electrode assembly 140 further comprises a plurality of movable locking members 166 for securing connectors 100 in a desired position. This function is discussed below in detail. Each locking member has portion 166*a* extending on one side of support member 148 and portion 166*b* extending on the opposite side of support member 148. To facilitate understanding of bottom electrode assembly 140, portion 166*a* of the locking member 166 on the extreme right-hand side in FIG. 11 has been cut away to enable viewing of connector 100 that is positioned on top comb 144. Portion 166*a* of each locking member 166 has an upwardly extending roll pin 168. Similarly, portion 166*b* of each movable locking member 166 has an upwardly extending roll pin 170. Bottom electrode assembly 140 further comprises locking member retainer 172 that is attached to support member 148. Screws 174 or other fasteners are used to attach locking member retainer 172 to support member 148. Locking member retainer 172 is attached to support member 148 in a manner such that a space is provided between support member 148 and retainer 172 to allow locking members 166 to move laterally with respect to support member 148 and retainer 172. Bottom electrode assembly 140 includes screws 175 that are used to prevent or allow movement of locking members 166. Upwardly extending pins 168 and 170 prevent locking members 166 from totally sliding out from the space between support member 148 and locking member retainer 172. Pins 168 and 170 also provide a means for a user to grasp a locking member 166 and move it to a desired position. Bottom electrode assembly 140 also includes electrode bus bar 176 that electrically connects negative electrode 146 to the negative polarity terminal of the power supply.

Figure 17:
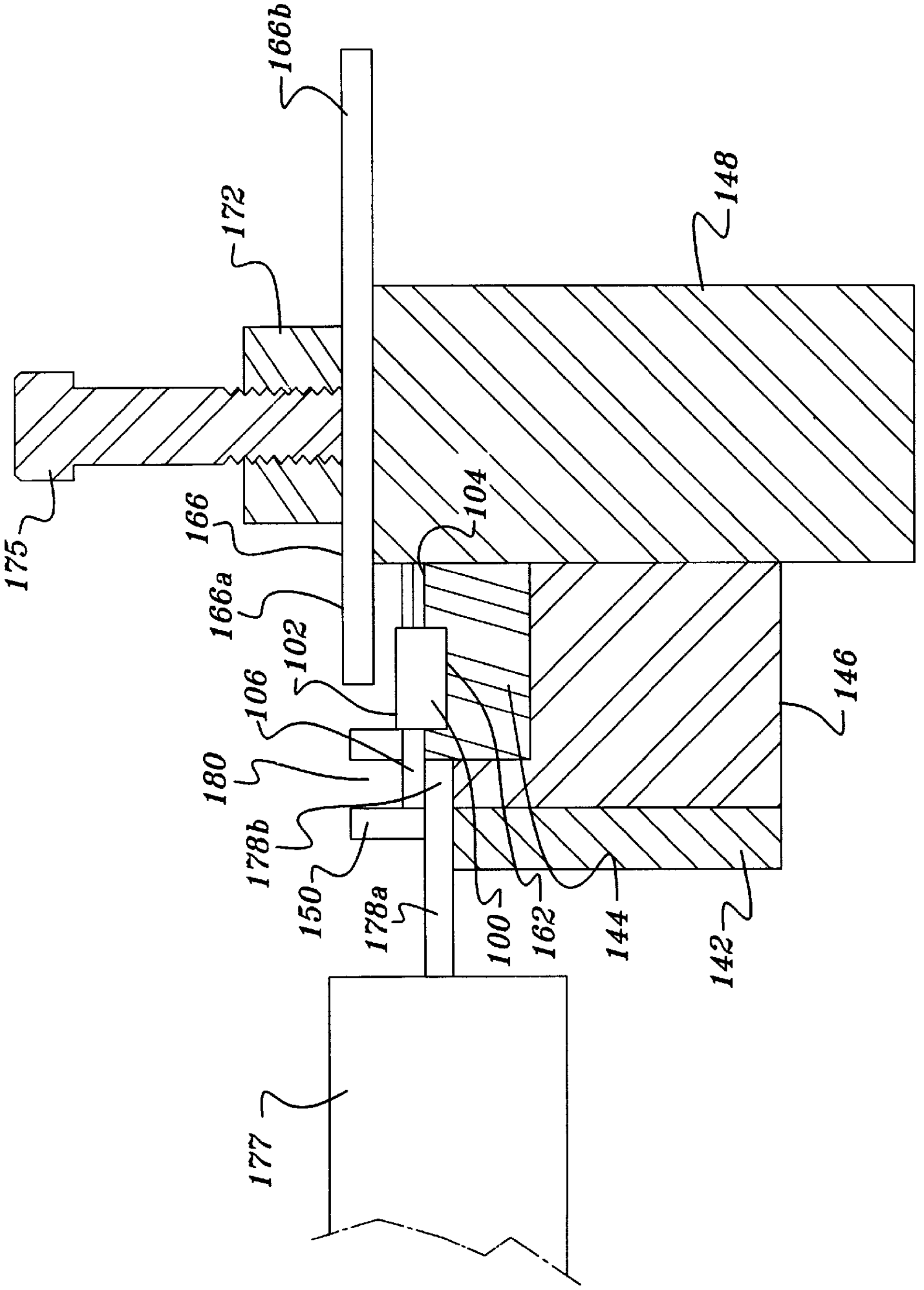
FIG. 17 is a cross-sectional view taken along line 17—17 of FIG. 11.

Referring to FIG. 17, a cross-sectional view taken along line 17—17 of FIG. 11 is shown with cable 177. Cable 177 includes at least one insulation-covered wire 178*a*. A portion of the insulation of wire 178*a* is removed to expose conductor 178*b*. Although only one wire 178*a* and conductor 178*b* are shown, it is to be understood that there are a plurality of conductors wires 178*a* and 178*b*. Conductors 178*b* are disposed through channels 150 of side comb 142. In another embodiment, conductors 178*b* are placed in a pre-line fixture (similar to fixture 54 described above). The pre-line fixture is then positioned so that conductors 178*b* are disposed through channels 150 of side comb 142 as described above.

Referring to FIG. 17, connector 100 is positioned on side comb 142 and top comb 144. Member 102 of connector 100 is disposed within channel 162. Screw 175 is adjusted to lock the locking member 166 in a manner such that portion 166*a* of locking member 166 is positioned over and member 102 of connector 100. Thus, member 166 firmly holds connector 100 in place thereby preventing movement of connector 100. Contacts 106 extend through channels 160 of top comb 144 and over negative electrode 146 and conductor 178*b*.

Referring to FIG. 17, the positioning and geometric shapes of side comb 142, top comb 144 and negative electrode 146 provide a space or gap 180. Gap 180 is sized for receiving lower portion 128 of electrode 122. When weld head 124 is depressed by the air cylinder and programming box, lower portion 128 of electrode 122 enters space or gap 180 and effects contact between distal end 130 of electrode 122 and contact 106 of connector 100. Since the contact between distal end 130 of electrode 122 and contact 106 is made with a predetermined compressive force, contact 106 is compressed against conductor 178*b*. As a result, conductor 178*b* is compressed against negative electrode 146. Similar to weld head 28, weld head 124 includes a micro-switch (not shown) that is activated when electrode 122 contacts contact 106 with the aforementioned predetermined force. When the micro-switch is activated, electrical current will flow from the power supply to electrode 122. This will be explained below in detail.

2) Method a) The first step of the method of the present invention is providing electrical connector 100 with at least one contact 104 and at least one contact 106.

b) Next, a portion of the insulation covering wire 178*a* of cable 177 is removed to expose conductor 178*a*. Conductor 178*b* is then disposed through channels 150 of side comb 142 so that conductor 178*b* extends over negative electrode 146.

c) The next step entails adjusting screws 175 to enable locking members 166 to be moved so as to expose channel 162 of top comb 144.

d) The next step entails positioning connector 100 as shown in FIG. 17 wherein (i) member 102 is positioned within channel 162 of top comb 144, (ii) each contact 106 is positioned over a corresponding conductor 178*b*, and (iii) each contact 104 is disposed within a corresponding channel 158. In order for each contact 106 to be positioned as such, each contact 106 extends through channels 160 of top comb 144 and over negative electrode 146.

e) Next, locking members 166 are moved so that portion 166*a* is positioned over member 102 of connector 100. Screws 175 are then adjusted or tightened to secure locking members 166 against body 102 of each connector 100.

e) The next step entails programming the programming box to control the air cylinder so as to depress weld head 124 at predetermined time increments to effect contact with the conductor/contact pair with the predetermined amount of compressive force. The predetermined time increments depend upon the distance separating each conductor/contact pair and the distance separating each connector 100.

f) Next, the step motor is configured to move bottom electrode assembly 140 at a rate that corresponds to the predetermined time increment at which at which weld head 124 is depressed by the air cylinder.

g) The next step entails commencing movement of bottom electrode assembly 140 so that each conductor/contact pair will confront (or pass directly underneath) electrode 122. In order to accomplish this, the step motor (not shown) is activated.

h) When weld head 124 descends its maximum distance, distal end 130 of electrode channel 122 enters space 180 (see FIG. 17) and firmly contacts the contact 106 of connector 100 thereby compressing contact 106 against conductor 178*b*. As a result, conductor 178*b* is compressed against negative electrode 146. During such contact, the micro-switch is activated and a current from the power supply is allowed to pass through positive lead 132, electrode 122, contact 106, conductor 178*b*, negative electrode 146 and negative electrode bus bar 176 (see FIG. 11). The flow of current, as described above, creates an electrical bond between contact 106 and conductor 178*b*. As used herein, the term "electrical bond" refers to a permanent, physical joint between contact 106 and conductor 178*b* such as a thermo-compression bond or a true weld. Whether a thermo-compression bond or a true weld is produced depends upon several factors, including: (i) the types of metals from which the conductors and contacts are fabricated, (ii) the magnitude of current flowing through conductor 178*b* and contact 106, and (iii) the magnitude of compressive force at which electrode 122 contacts the contact 106 and conductor 178*b*. Thus, the aforementioned factors must be considered when determining whether a thermo-compression bond or a true weld is required.

i) After the electrical bond is created between each pair conductor/contact pair, weld head 124 is retracted or withdrawn from space 180. The step motor then moves bottom electrode assembly 140 so that the next conductor/contact pair is positioned directly under electrode 122. Once bottom electrode assembly 140 is positioned to the desired location, weld head 124 is then depressed so as to enter space 180 and exert the predetermined compressive force upon contact 106, conductor 178*b* and negative electrode 146.

j) Steps (g)–(i) are repeated until an electrical bond is created between every contact 106 and corresponding conductor 178*b*. Thus, steps (g)–(i) are repeated for each connector 100 that is secured to top comb 144.

Advantages

As shown by the foregoing description, the method of the present invention effects a reliable and durable electrical bond between the contacts and the conductors. Such a bond can withstand mechanical forces or vibrations. For example, the electrical bond created can withstand "pulling forces" that are created when users are handling the cables to which the cables are attached. Unlike the aforementioned "force-fit" type electrical connections discussed above, the electrical bond created by both embodiments of the method of the present invention can withstand such pulling forces. Thus, the possibility of short or long term failures due to mechanical forces are substantially eliminated.

Both embodiments of the method of the present invention do not require additional material to be added to the contact elements. Specifically, the method of the present invention does not require the manual application of solder to the contacts or conductors. Thus, the inherent problems with solder joints, e.g. cold joints, short circuits, flux, etc., which were described above, are substantially eliminated. However, it is to be understood that although both embodiments of the method of the present invention do not require the manual application of solder, both embodiments of the method of the present invention can be used with contacts or conductors that are "tinned", pre-coated or plated with solder. For example, if conductors are comprised of strand wires, the wires may be first "tinned".

The reliability of the electrical bond produced by both embodiments of the method of the present invention also prevents changes in impedance seen by the signals inputted into the other end of the cable to which the connectors are attached. Thus, the possibility of signal glitches or intermittent signals are substantially eliminated.

Thus, the method and apparatus of the present invention:

a) produces electrical bonds that are more reliable than connections produced conventional methods;

b) produces electrical bonds without the use of flux;

c) can be used in the repair or manufacture of connectors;

d) can be used on a variety different type and shape connector contacts;

e) can be used on a variety different type and shape conductors, e.g. solid, strand, etc.; and f) can be implemented at a reasonable costs.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for producing an electrical bond between a conductor and an electrical connector contact, comprising the steps of:

(a) providing an apparatus comprising a power source and a weld head, the power source having a first polarity output and a second polarity output, the weld head having a single electrode attached thereto and an input for connection to the first polarity output of the power source, the singe electrode being electrically connected to the weld head input, the apparatus further including another electrode electrically connected to the second polarity output of the power source;

(b) positioning the conductor and the connector contact so that the conductor and connector contact are in physical contact with one another and the conductor and connector contact are intermediate the single electrode and said another electrode;

(c) contacting the conductor and the connector contact with the single electrode with a predetermined compressive force so that the conductor and connector contact are pressed against each other and against said another electrode; and (d) allowing a current of a predetermined magnitude to flow through the singe electrode, the conductor and connector contact, and said another electrode.

2. The method according to claim 1 wherein step (b) comprises the step of positioning the connector contact such that it is intermediate the conductor and said another electrode.

3. The method according to claim 1 wherein step (b) comprises the step of positioning the conductor such that it is intermediate connector contact and said another electrode.

4. The method according to claim 1 wherein the apparatus further comprises a fixture, the method further comprising the steps of securing the conductor and connector to the fixture.

5. The method according to claim 4 wherein the apparatus further comprises a device for moving the fixture at a predetermined rate, an air cylinder for moving the weld head and a controller for controlling the (i) device, (ii) weld head, and (iii) air cylinder, the method further comprising the steps of:

moving the fixture at a predetermined rate so that each conductor and corresponding connector contact confronts the single electrode; and moving the weld head so as to effect contact between the single electrode and the conductor and corresponding connector contact, the singe electrode contacting the conductor and corresponding connector contact with a predetermined amount of compressive force, the movement of the weld head being at a rate that corresponds to the predetermined rate at which the fixture is moved.

6. The method according to claim 1 wherein the electrical connector has a plurality of contacts wherein each contact is to be electrically bonded to a corresponding conductor, the method further comprising the steps of:

(e) retracting the weld head so as to break the physical contact between the single electrode and the connector contact and corresponding conductor;

(f) moving the connector contact and corresponding conductor so that a next connector contact and corresponding conductor are aligned with the single electrode; and (g) repeating steps (b)–(f) until an electrical bond is produced between each connector contact and corresponding conductor.

7. The method according to claim 1 wherein the single electrode extends to a distal end, the distal end comprising a substantially planar surface.

8. The method according to claim 1 wherein the singe electrode extends to a distal end, the distal end having a channel formed therein, the channel being sized to receive a connector contact and corresponding conductor.

9. The method according to claim 1 wherein the electrical connector has an electrically non-conductive body to which the contacts are attached, the body having a pair of ends, the connector contacts comprising a pair of spaced-apart rows of contacts extending between the body ends, the method of further comprising the steps of:

after step (a), forming slots in each body end, the slots being generally aligned with the space between the rows of contacts; and after step (d), inserting an insulating member through the slots and the space between the rows of contacts.

10. The method according to claim 9 further comprising the step of applying epoxy to the insulating member after it is inserted into the slots and between the rows of contacts.

* * * * *

UNITED STATES PATENT AND TRADEMARK OFFICE

CERTIFICATE OF CORRECTION

PATENT NO. : 6,137,075
DATED : October 24, 2000
INVENTOR(S) : Grabowski et al.

It is certified that error appears in the above-identified patent and that said Letters Patent is hereby corrected as shown below:

Claim 1,
Delete "singe" wherever shown and substitute therefor -- single --.

Claim 5,
Delete "singe" and substitute therefor -- single --.

Claim 8,
Delete "singe" and substitute therefor -- single --.

Signed and Sealed this

Twenty-fifth Day of September, 2001

*Attest:*

Nicholas P. Godici

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : 6,137,075 
DATED : October 24, 2000
INVENTOR(S) : Grabowski et al.

It is certified that error appears in the above-identified patent and that said Letters Patent is hereby corrected as shown below:

Column 13,
Line 32, delete “singe” and substitute therefor -- single --.

Column 14,
Line 16, delete “singe” and substitute therefor -- single --.
Line 37, delete “singe” and substitute therefor -- single --.

Signed and Sealed this

Nineteenth Day of October, 2004

JON W. DUDAS
*Director of the United States Patent and Trademark Office*